United States Patent
Mendonca et al.

(10) Patent No.: US 7,143,121 B2
(45) Date of Patent: Nov. 28, 2006

(54) METHOD AND SYSTEM FOR ARCHIVING AND RESTORING DATA FROM AN OPERATIONS CENTER IN A UTILITY DATA CENTER

(75) Inventors: John Mendonca, Redwood City, CA (US); Rheid Schloss, Fort Collins, CO (US); Blaine Southam, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 524 days.

(21) Appl. No.: 10/635,594

(22) Filed: Aug. 5, 2003

(65) Prior Publication Data

US 2004/0267839 A1    Dec. 30, 2004

Related U.S. Application Data

(60) Provisional application No. 60/483,030, filed on Jun. 27, 2003.

(51) Int. Cl.
*G06F 12/00* (2006.01)
*G06F 17/30* (2006.01)
(52) U.S. Cl. ............... 707/204; 707/202; 711/161; 711/162
(58) Field of Classification Search .......... 707/1, 707/200–202, 3, 204; 709/202, 204, 226, 709/224; 714/4, 6; 711/161, 162
See application file for complete search history.

(56) References Cited

U.S. PATENT DOCUMENTS

| | | | | |
|---|---|---|---|---|
| 5,276,860 | A | * | 1/1994 | Fortier et al. ............... 714/6 |
| 5,813,017 | A | | 9/1998 | Morris |
| 6,487,561 | B1 | * | 11/2002 | Ofek et al. ............ 707/204 |
| 6,487,644 | B1 | | 11/2002 | Huebsch et al. |
| 6,629,110 | B1 | * | 9/2003 | Cane et al. ............ 707/204 |
| 6,640,217 | B1 | * | 10/2003 | Scanlan et al. ............ 707/1 |
| 6,714,980 | B1 | * | 3/2004 | Markson et al. ......... 709/226 |
| 6,745,210 | B1 | * | 6/2004 | Scanlan et al. ........... 707/204 |
| 2002/0107877 | A1 | | 8/2002 | Whiting et al. |

FOREIGN PATENT DOCUMENTS

| | | |
|---|---|---|
| EP | 1168174 A1 | 1/2002 |
| WO | WO 01/04756 A1 | 1/2001 |
| WO | WO 01/06368 A1 | 1/2001 |
| WO | WO 01/52116 A1 | 7/2001 |

\* cited by examiner

*Primary Examiner*—Jeffrey Gaffin
*Assistant Examiner*—Jacques Veillard

(57) ABSTRACT

A system and method for archiving and restoring data from an operations center of a utility data center are described. The system includes a number of database systems, located in the operations center, a cell manager, located in a utility controller of the utility data center and coupled to each of the database systems through a designated port in a firewall. The system also includes a media agent coupled to each of the databases and to the cell manager. The media agent is configured to receive data from the database systems for forwarding to an archival storage device.

28 Claims, 6 Drawing Sheets

METHOD AND SYSTEM FOR ARCHIVING AND RESTORING DATA FROM AN OPERATIONS CENTER IN A UTILITY DATA CENTER

RELATED U.S. APPLICATION

This application claims priority to the provisional patent application Ser. No. 60/483,030, entitled "A Method And System For Archiving And Restoring Data From An Operations Center In A Utility Data Center," with filing date Jun. 27, 2003, assigned to the assignee of the present application, and hereby incorporated by reference in its entirety.

FIELD OF THE INVENTION

Embodiments of the present invention relate to the field of system networks. Specifically, embodiments of the present invention relate to networks used as utility data centers, for example.

BACKGROUND OF THE INVENTION

Modern networking continues to provide improvements and expansion for communication and information access. The continuing growth of networking systems and technology seems limitless and the speed of networked communications has brought benefits to nearly every human endeavor.

Recent trends in information technology have seen large enterprises and other users moving towards a new paradigm of network utilization, the provisionable utility data center (UDC). A UDC allows a centralization of information technology (IT) services and enterprise-wide, or even internet-wide, access to specialized data and functions. The various moves to re-centralize IT systems of all kinds is driven in part by shortages in IT staff and by the intrinsic inefficiencies of distributed systems. Notably, many IT managers are migrating to a smaller number of large data centers. Enabled by abundant and relatively inexpensive network bandwidth, IT services can now be distributed to users globally. The need to nest server-side technology near the client workstation is lessening, which has led to this dramatic change in IT architecture.

This re-centralization requires greater resilience, reliability and security, since a failure of shared resources or a loss of critical data can affect an enterprise using a UDC to a large degree. At the same time, though, consolidated provisionable UDCs can more easily be engineered to eliminate single points of failure.

Another trend is the growing importance of third-party service providers. Networking enterprises are finding it advantageous to turn to service providers instead of bearing the cost of internal development, deployment, and maintenance of their own in-house systems. In areas such as global networking, service providers dominate in provisioning a commodity resource that enterprises would find it difficult to develop individually. Storage service providers allow enterprises to cache data conveniently. A small, but growing, contingent of application service providers (ASPS) now are able to operate enterprise software systems. IT service providers are exploiting the opportunity to consolidate across enterprises, which allows them to be highly competitive with internal IT organizations.

The system management tools available to reliably operate and secure the resultant necessarily complex network systems are also emerging. Constant, dynamic, reprovisioning of resources to match shifting clients and client needs depends on a strong IT resource management foundation.

Even more than earlier distributed networks, provisionable data center networks are exposed to possible security lapse and even attack through the multitudinous communications links such systems entail. Because there is necessary communication within and between resources contained within the provisionable data center, as well as communication with users outside the network, the possible avenues of security failure are many.

Referring to Prior Art FIG. 1, UDC 100 is comprised of three trust domains. Each domain is separated by security technology that controls access across the trust boundary. The three trust domains are the Operations Center (OC) 110, the Utility Controller (UC) 120 and the Resource Pool 130. Resource Pool 130 contains the resources that are deployed into "farms" of dynamically provisioned computer systems, storage and networks, such as Farm A 180a, Farm B 180b, Farm C 180c and Farm D 180d. These farms comprise allocated devices. Resource Pool 130 can also contain non-allocated devices that are available for future allocation. This is an untrusted domain.

The OC 110 contains systems that permit operators to define the allocation and reallocation of resources and to perform business management for the storage service provider. The UC 120 contains systems and software for implementing operator instructions from the OC 110. The UC 120 provides the control logic to actually provision farms 180a–180d with resources and to allocate devices. The OC 110 is a high trust domain, but not as highly trusted as the UC 120 domain, and is separated from UC 120 by firewall 145. Together UC 120 and resource pool 130 constitute service core 115. The UC 120 is the most highly trusted of the trust domains.

Systems in the UC 120 and OC 110 are assigned either real or virtual disks that contain data that is important to the operation of service core 115. In order to protect the provisional service core's 115 resource pool from a denial of service resulting from the loss or corruption of data, the utility controller 120 provides a mechanism to automatically archive and retrieve all data that is logically associated with systems in the operations center and utility controller. This archiving mechanism operates within the UC 120 and is protected by the firewall 145 of the highly trusted domain. The Operations Center (OC) and the UC are also protected by firewall 155 that separates the OC from the outside world. Cell manager 140 contains a list of the systems and files that are to be backed up and the schedules for backing up the various systems. A disk agent 150 resides on each system that is to be backed up. At an appointed backup time, cell manager 140 sends a message to disk agent 150 to begin the backup process. Cell manager 140 also sends a message to media agent 160, advising that data is about to be received. Disk agent 150 then sends the data to media agent 160 and media agent 160 forwards the data to data backup storage device 170 (e.g., tape or disk storage).

OC 110, having a lower level of trust than the Utility Controller 120, has no access to the automatic archival (or backup) and retrieval mechanism used by the UC 120 for backing up utility controller 120. Therefore, operators of the UDC wishing to backup the OC 110 data need to configure the OC 110 with its own archival storage media, such as a tape storage unit or a tape drive, that is connected to its computer systems. Software would be needed on each computer system to copy data files to the backup media on the system where the storage unit is provisioned. In order to perform a backup of the system, it would be necessary to shut down any applications that are running before the backup would commence to prevent incomplete transactions from being backed up. In addition, safeguards would be needed to prevent backup data from being lost, being restored to the wrong system, or being incorrectly associated with a system when the backup is created. Such software development is manpower intensive and expensive.

SUMMARY OF THE INVENTION

A system and method for archiving and restoring data from an operations center of a utility data center is described. In one embodiment, the system includes a number of systems, some of which include a database, located in the operations center, a cell manager, located in a utility controller of the utility data center and coupled to each of the operations center systems through a designated port in a firewall. In one embodiment, the system also includes a media agent coupled to each of the operations center systems and to the cell manager. The media agent is configured to receive data from the operations center systems for forwarding to an archival storage device.

BRIEF DESCRIPTION OF THE DRAWINGS

Prior Art

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

The following detailed description pertains to a method and system for archiving and restoring data from an operations center of a utility data center. A system and method are disclosed for providing automatic backup and retrieval of data in the operations center of a utility data center, utilizing the backup mechanism employed by the utility controller, as augmented to prevent corruption of data during the backup process due to applications that may be running and to allow communication across security firewalls. The system includes a database technology that supports a backup mode so that applications that are running at the time of backup do not need to be manually stopped before the running of a backup.

Figure 4:
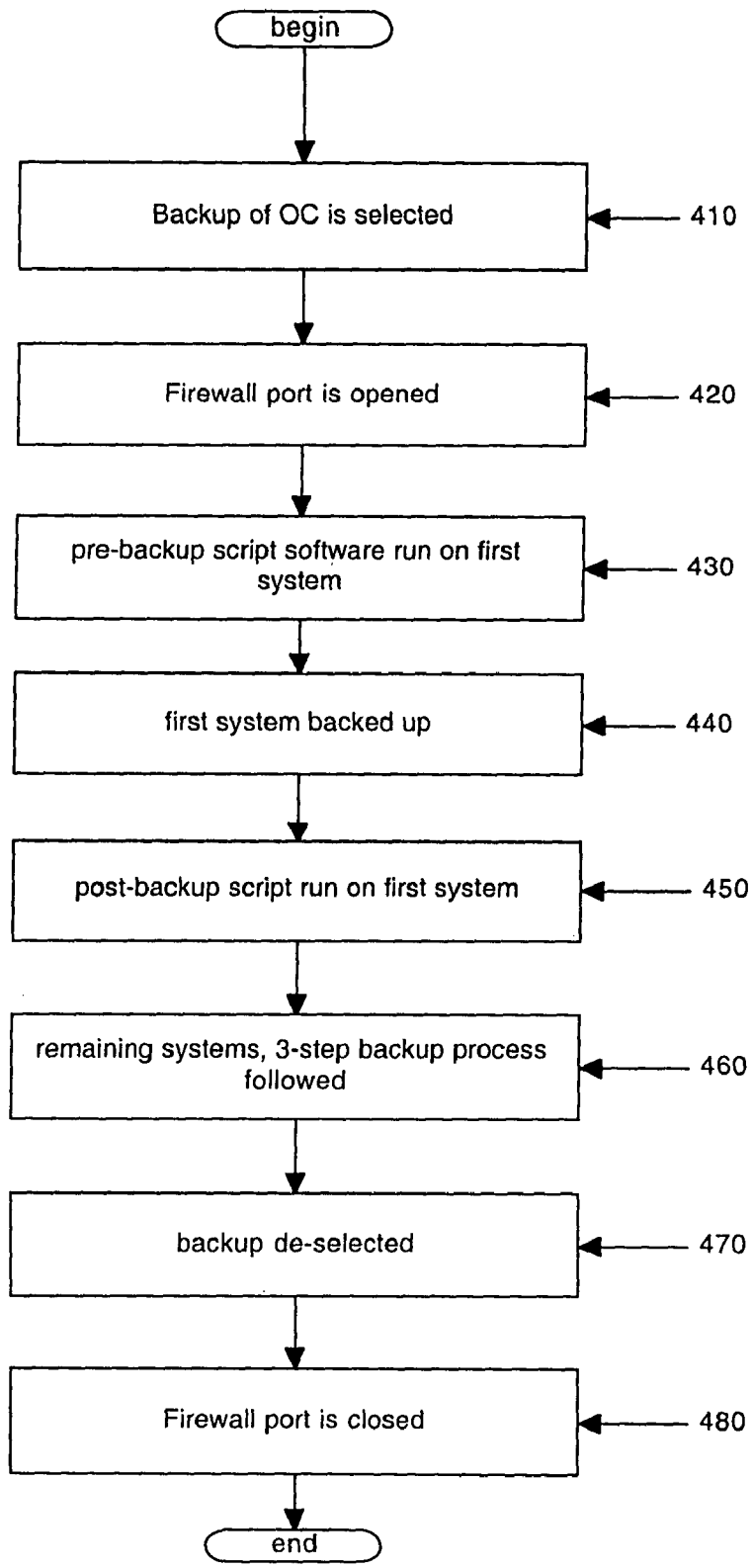
FIG. 4 is a flow diagram of a method for backing up data in an operations center, in accordance with one embodiment of the present invention.
Figure 5:
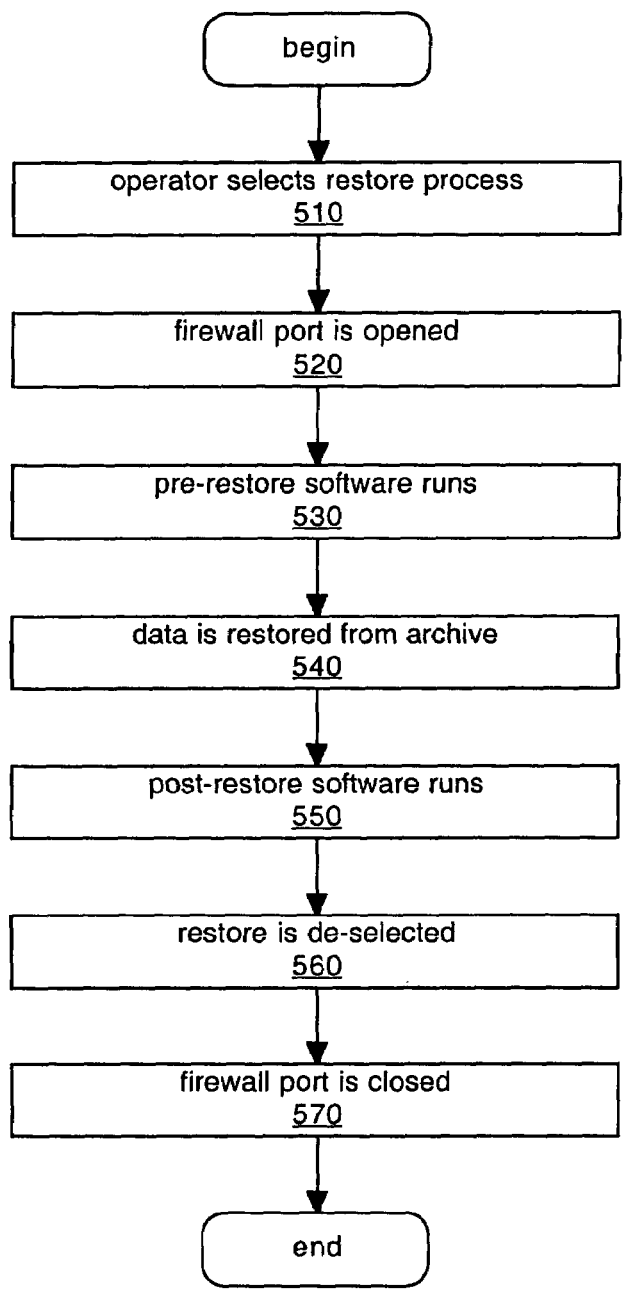
FIG. 5 is a flow diagram of a method for restoring data in an operations center, in accordance with one embodiment of the present invention.

Certain portions of the detailed descriptions of embodiments of the invention, which follow, are presented in terms of processes and methods (e.g., methods 400 and 500 of FIGS. 4 and 5). Although specific steps are disclosed herein describing the operations of these processes and methods, such steps are exemplary. That is, embodiments of the present invention are well suited to performing various other steps or variations of the steps recited in the flowcharts of the figures herein.

Embodiments of the present invention provide an automated backup mechanism for a utility data center's (UDC) operations center (OC). One embodiment of the present invention allows the OC to utilize existing archival storage media and software to schedule backups and to copy data files to the backup media. One embodiment of the present invention provides novel software on each system to quiesce applications prior to a backup or restoration operation and safeguards to prevent backup data from being restored to the wrong system or being incorrectly associated with a system when the backup is being created.

Figure 1:
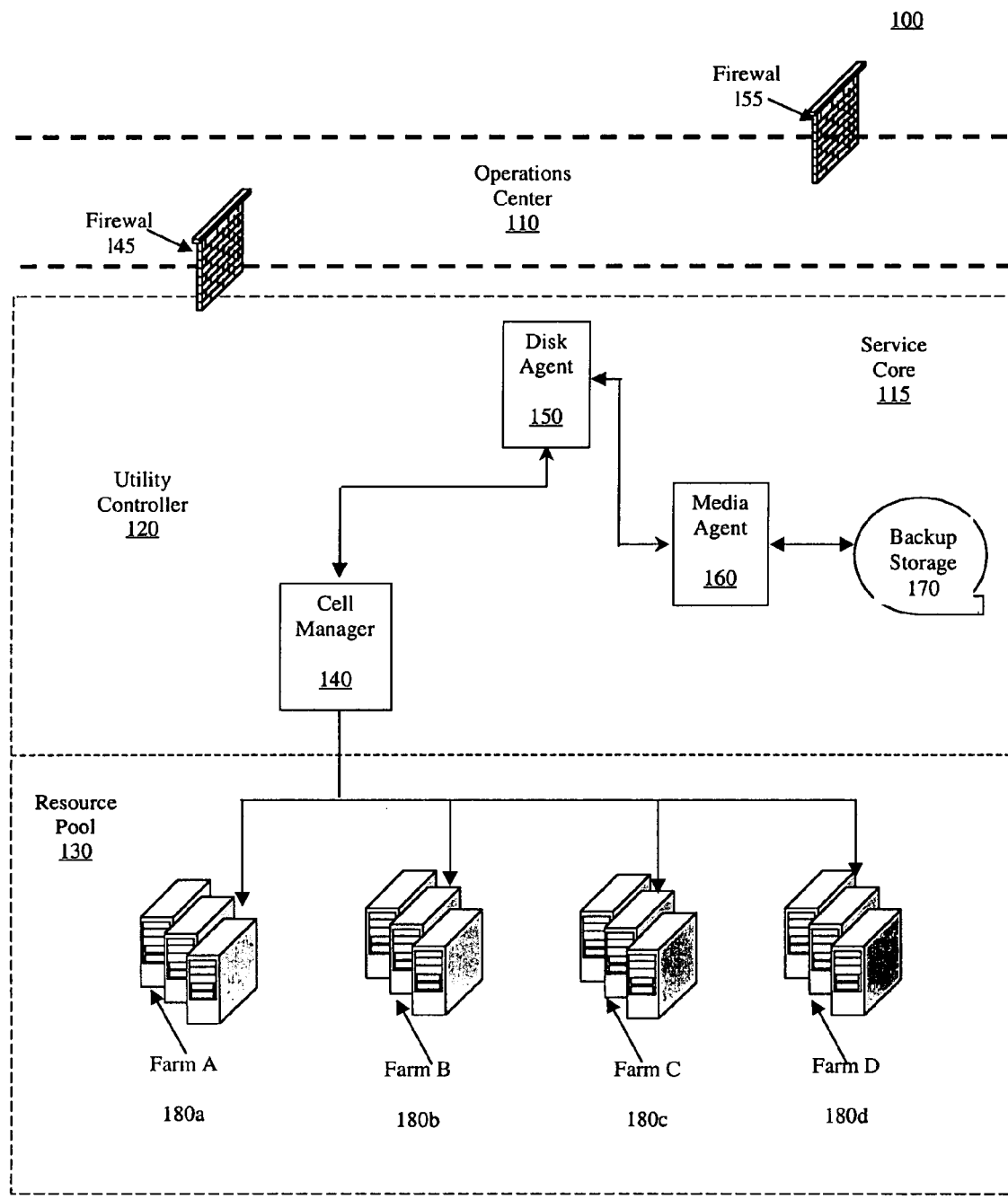
FIG. 1 is a block diagram illustrating a conventional system for backing up data in the service core of a utility data center.
Figure 2:
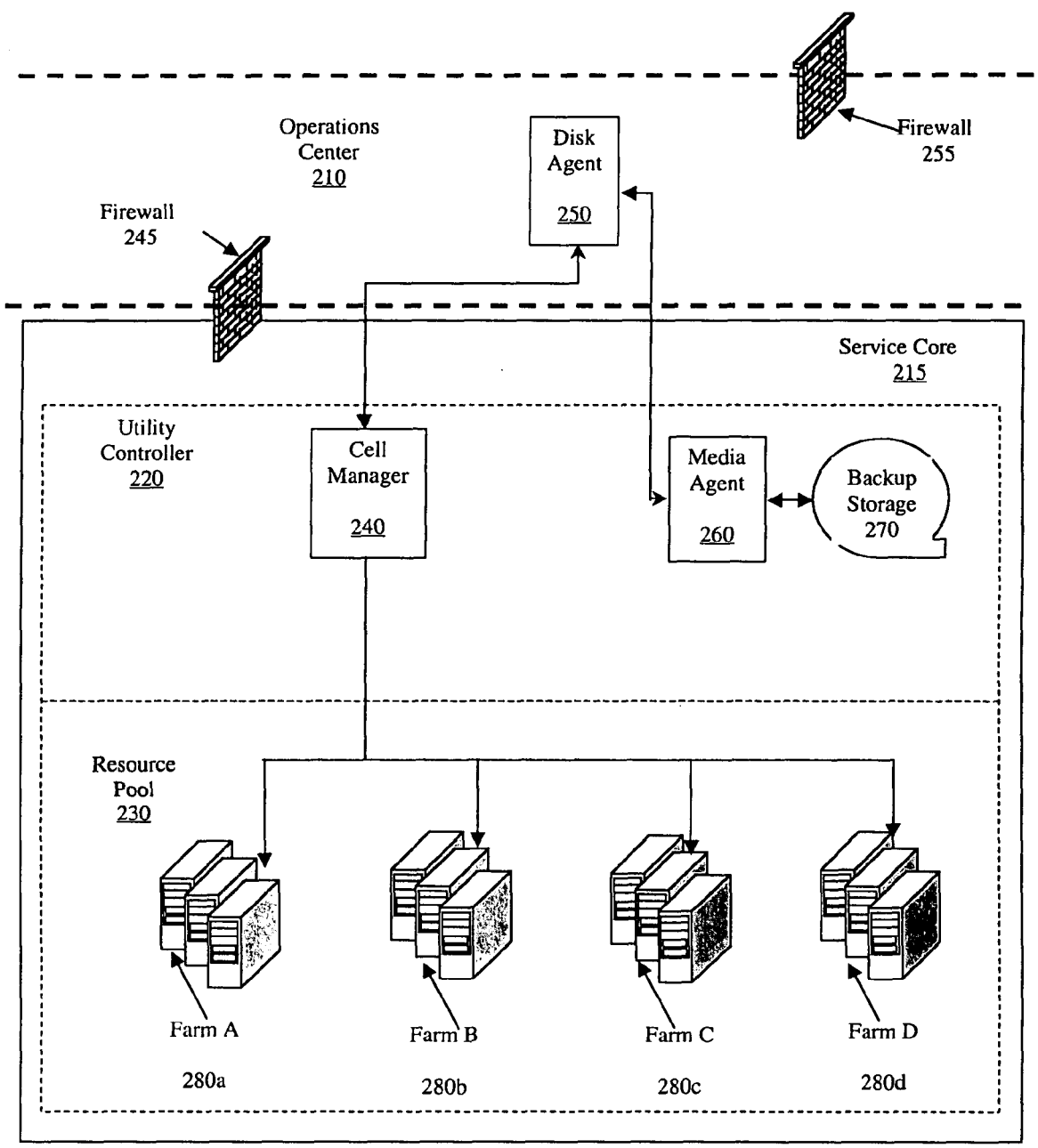
FIG. 2 is a block diagram illustrating a system for backing up data in an operations center of a utility data center, in accordance with one embodiment of the present invention.

Specifically, embodiments of the present invention provide the advantages of: automatic and periodic, full and incremental archival backups of OC systems; software to ensure that data integrity is maintained when data is backed up and restored; software and/or procedures to prevent masquerading type attacks; and access to storage media and devices that already exist in the UDC. Embodiments of the present invention also include software to automatically configure a firewall to allow communication to pass in order for archival backup or restore procedures to occur, and then, upon completion of the procedure, automatically restore the firewall to its original settings Referring now to FIG. 2, a block diagram 200 illustrating a system for backing up data in OC 210 of a UDC is presented, in accordance with one embodiment of the present invention. OC 210 is protected from the outside world by firewall 255. A disk agent 250 is located on each of the systems in OC 210 for which data is to be backed up and archived on a periodic basis. OC 210 can be affiliated with multiple service cores 215, each service core 215 comprising a UC 220 and a resource pool 230. A single service core 215 is designated for the purpose of controlling the backing up of OC 210. Disk agent 250 is logically connected to cell manager 240 and to media agent 260 in UC 220 of service core 215, through a normally closed port in firewall 245. Cell manager 240 contains a list of the systems and files that are to be backed up and the schedules for backing up the various systems and files. At the appointed time for backing up the data in OC 210, the cell manager 240 initiates the backup process.

By means of novel backup software residing on cell manager 240, in accordance with one embodiment of the present invention, when the appointed time arrives for backing up data in OC 210, cell manager 240 opens the port in firewall 245 and causes a pre-backup program, residing on the system to be backed up (the targeted system), to execute. The pre-backup program and a post-backup program are provided for each targeted system residing in OC 210.

According to one embodiment, the pre-backup program is designed to quiesce (put in a suspended state from which any applications that are running may continue to run following the backup, and from which the pre- and post-backup programs can properly implement the backup of in-process information) any applications that are running on the targeted system so as not to corrupt any data during the backup process. Once the system has been backed up, a post-backup program is executed to restore the system to a normal operating state.

In another embodiment, the application or applications that are running at the time of the backup may have an embedded backup mode. In the instances where the application has a backup mode, the pre-backup script will place the application in backup mode rather than suspend it. In such an instance, the post-backup script will then remove the application from backup mode so that it may continue to run.

Cell manager 240 then sends a message to disk agent 250, which resides on the targeted system, advising disk agent 250 to begin the backup process. Cell manager 240 also sends a message to the media agent 260, advising that data is about to be received. Disk agent 250 then sends the data to media agent 260 and media agent 260 forwards the data on to backup storage device 270 where it is archived. Backup storage device can be a tape library (e.g., a robotic system of multiple tapes), a large disk storage unit, or any mass memory storage that is accessible via media agent 260.

In another embodiment, OC 210 may be configured as a farm (e.g., Farm A 280a) in the service core 215 of the UDC. Each system will have a disk agent, a pre-backup script, a post-backup script, and restore software. A farm will have a firewall to protect OC 210 from unauthorized access by other farms. The farm firewall will be configured in a manner similar to firewall 245 to allow backup and restore traffic.

Figure 3:
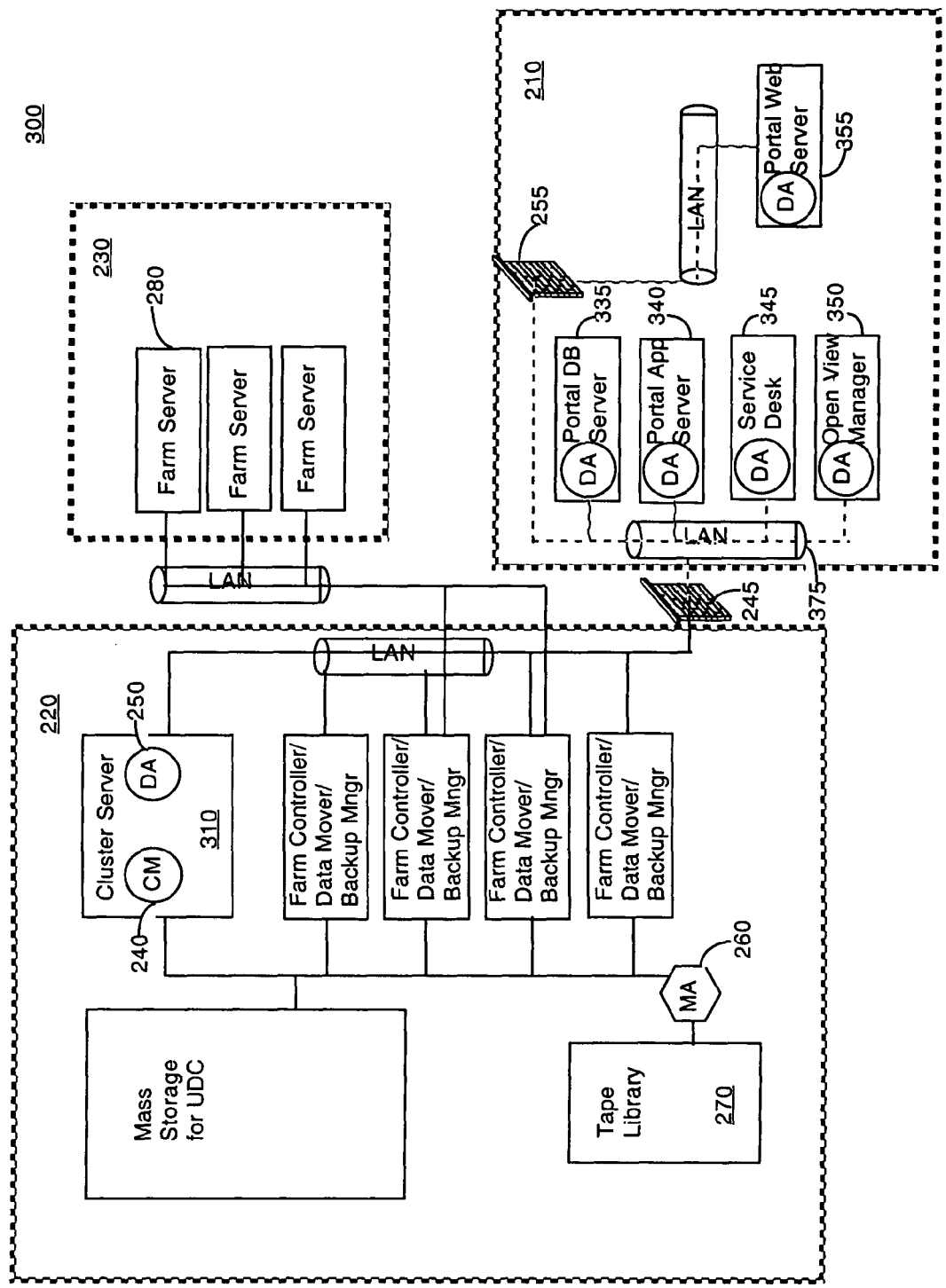
FIG. 3 is a block diagram illustrating a utility data center configured for archiving and restoring data in an operations center, in accordance with one embodiment of the present invention.

FIG. 3 is a block diagram illustrating a UDC 300 configured for archiving and restoring data in operations center (OC) 210, in accordance with one embodiment of the present invention. Resource pool 230 contains allocated farms of resources accessed by farm servers, such as farm server 280. Resource pool 230 may also contain unallocated resources that are available for creating new farms or augmenting existing farms. Together, resource pool 230 and utility controller (UC) 220 make up a service core (e.g., service core 215 of FIG. 2). A single UDC 300 may have several service cores, but only one OC 210. In such an instance, one of the service cores will be designated to perform the backup and data archival for OC 210.

Cluster server 310, located in UC 220, contains cell manager 240 for managing the backup operations within UC 220 and its associated resources. Assuming that UC 220 is in the service core designated to backup OC 210, cell manager 240 is also designated to manage the backup and archival of data from OC 210. Disk agent 250 is present for sending backup data from cluster server 310 to archival storage when the appointed time for its backup arrives. Media agent 260 may of may not reside on cluster server 310. Media agent 260 mediates access to the archival storage (e.g., tape library 270) for the various disk agents on the systems that require backup. The various computer and database systems within UDC 300 are coupled via local area networks (LANs), such as LAN 375 that connects OC 210 with UC 220.

Firewall 245 provides security between UC 220, which has the highest level of trust, and OC 210, which has a lower trust level, according to one embodiment of the present invention. Firewall 255 protects the other systems in OC 210 from portal web server 355, also a part of OC 210, which interfaces with the Internet. Typical systems in OC 210 that can be backed up in accordance with embodiments of the present invention are illustrated within OC 210. These systems can include, but are not limited to, portal database server 335, portal applications server 340, service desk server 345, open view manager 350 and portal web server 355. Each server has a resident disk agent (e.g., disk agent 250) to manage the sending of data to media agent 260 for archiving in data storage such as tape library 270, or a similar device configured for storing large amounts of archived data.

Portal database server 335 contains the main database for all service cores, including work flow management and configuration information for the systems and how they are connected. Portal applications server 340 may contain access logs relative to who is accessing what information. Service desk 345 may function as an Information Systems Manager and may track billing information for accessing of Internet and farms. Open view manager 350 handles event information that is tied into trouble ticketing. Portal web server 355 contains information such as backup web service logs, access logs and applications. Thus, it is important to be able to archive and restore the OC 210 database information.

In another embodiment, OC 210 may be configured as a farm (e.g., accessed by farm server 280 in the resource pool 230 of a service core of UDC 300). Each database can have a disk agent, a pre-backup script, a post-backup script, restore software and a firewall to protect UC 220 from OC 210.

FIG. 4 is a flow diagram illustrating a method 400 for backing up data in an operations center (OC), in accordance with one embodiment of the present invention. Method 400 begins with step 410 in which a backup of the OC in a UDC is selected. The backup can be automatically selected by a cell manager (e.g., cell manager 240 of FIG. 3) residing in the utility controller (UC) of a service core of the UDC according to a predetermined schedule. In one embodiment, a backup of the OC may be selected manually, by an operator, from the system to be backed up.

At step 420 of FIG. 4, a designated port in a firewall (e.g., firewall 245) is opened to allow communication between the OC and the UC, according to one embodiment of the present invention. This is necessary for moving data from the systems in the OC to the archival storage device that resides in the UC. In one embodiment, if the system in the OC that is being backed up interfaces with a less trusted environment, such as the Internet, there may be a port in an additional firewall (e.g., firewall 370 of FIG. 3) that is also opened.

Referring now to step 430 of FIG. 4, pre-backup script software is run on a first system. In one embodiment there may be several systems to be backed up, such as, for example, a portal database server, a portal applications server, a service desk, an open view manager and a portal web server. In another embodiment, there may be only one system to be backed up. The pre-backup script software resides on the system being backed up and is initiated by the cell manager residing in the UC. The pre-backup script is designed to quiesce the system so that a backup can be performed and data integrity maintained while running applications. This offers the advantage of not having to shut down the system before backing it up. In one embodiment, the pre-backup script may put a system's databases in a backup mode, such that the system's applications can continue to operate, perhaps in a degraded mode, while the system is being backed up.

At step 440 of FIG. 4, the system is backed up, in accordance with one embodiment. The backup begins when the disk agent (e.g., disk agent 250 of FIG. 2) residing on the system targeted for backup begins sending data to the media agent (e.g., media agent 260 of FIG. 2), the media agent having been alerted by the cell manager to be ready to receive the data from the designated targeted system. As the media agent receives the data from the targeted system, it forwards it to a backup storage device, such as tape library 270 of FIG. 3, for archival storage.

When all the data has been transferred, method 400 of FIG. 4 moves to step 450 and a post-backup script is run on the system. The post-backup script is designed to restore the system to the state it was in prior to the running of the pre-backup script. This concludes the backup for the first system.

If there are no more systems targeted for backup, method 400 moves to step 470. If there are other systems to be backed up, method 400 goes to step 460 and performs steps 430, 440 and 450 for the remaining systems, one at a time.

At step 470 the backup is complete and is deselected by the cell manager. Once the backup is deselected, method 400 moves to step 480 and the cell manager closes the firewall port and method 400 is exited.

Referring now to FIG. 5, a flow diagram of a method 500 for restoring data in an operations center (OC) is presented, in accordance with one embodiment of the present invention. Beginning with step 510 of method 500, an operator selects a restore process for restoring data to a system in the OC (e.g., OC 210 of FIG. 3) of a UDC from archival storage. The restore process is generally performed as the result of a system outage. The system outage may be the result of a catastrophic failure or of an outage for routine maintenance, for example.

According to one embodiment, when the restore process is initiated, the cell manager (e.g., cell manager 240 of FIG. 2) in the utility controller (UC) of the UDC is notified and step 520 is entered. In step 520, the cell manager causes a designated port in a firewall (e.g., firewall 245 of FIG. 2) to open to allow communication between the OC and the UC (e.g., UC 220 of FIG. 3), according to one embodiment of the present invention. This is necessary for moving data from the archival storage device (e.g., tape library 270 of FIG. 2) that resides in the UC systems to the system in the OC that is targeted for data restoration. In one embodiment, if the system in the OC that is being restored interfaces with a less trusted environment, such as the Internet, there may be a port in an additional firewall (e.g., firewall 370 of FIG. 3) that is also opened.

Still referring to FIG. 5, once the firewall port is opened, in one embodiment of the present invention, the cell manager causes pre-restore software to be run on the targeted system. The pre-restore software runs to quiesce any applications that might be running on the targeted system. Although it may be expected, in the case of a catastrophic failure, that there would be no applications running, there may be a need to restore data for other reasons, such as, for example, to assure that the correct information is present following a maintenance outage. In such an instance, the pre-restore software assures that a data restoration can be performed and data integrity maintained while running applications. This offers the advantage of not having to shut down the system before restoring information.

Method 500 of FIG. 5 now moves to step 540 at which point the cell manager in the UC notifies the media agent (e.g., media agent 260 of FIG. 2) in the UC as to the targeted system in the OC and the data that is to be restored, in accordance with one embodiment of the present invention. The cell manager also alerts the disk manager on the targeted system (e.g., portal database server 335 of FIG. 3) in the OC to expect to receive data from the media agent. The media agent then retrieves the indicated data from the archival storage device and forwards it to the disk agent on the targeted system in the OC. The disk agent then restores the data to the targeted system.

When all the data has been transferred and restored, method 500 moves to step 550 and post-restore software is run on the system. The post-restore software is designed to restore the system to its normal running state. This concludes the restoration of data to the targeted OC system.

At step 560 the restore process is complete and is deselected by the cell manager. Once the restore is deselected, method 500 moves to step 570 and the cell manager closes the firewall port and method 500 is exited.

Figure 6:
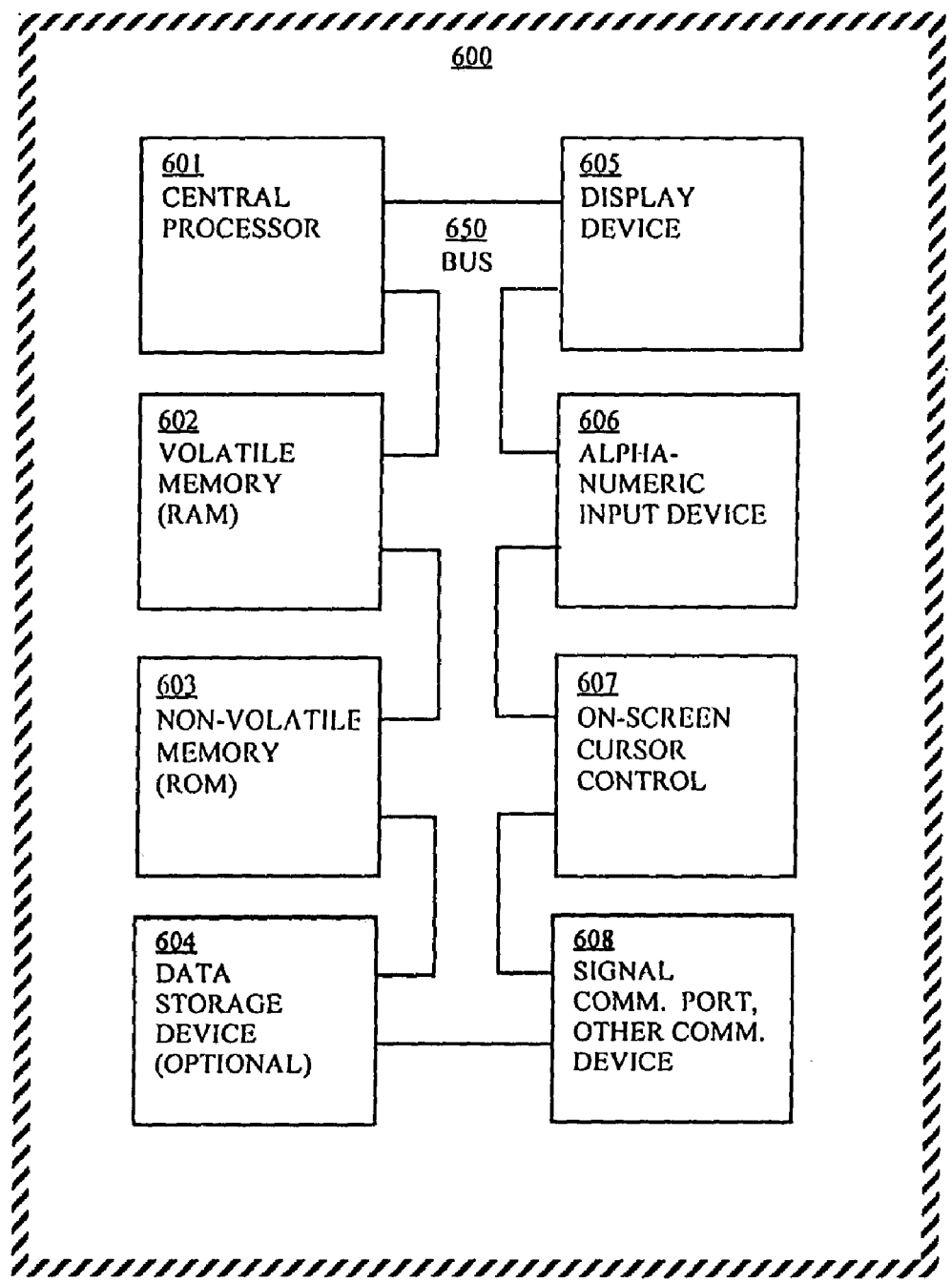
FIG. 6 is a block diagram of an exemplary computer system, in accordance with one embodiment of the present invention.

The software components of embodiments of the present invention run on computers. A configuration typical to a generic computer system is illustrated, in block diagram form, in FIG. 6. Generic computer 600 is characterized by a processor 601, connected electronically by a bus 650 to a volatile memory 602, a non-volatile memory 603, possibly some form of data storage device 604 and a display device 605. It is noted that display device 605 can be implemented in different forms. While a video cathode ray tube (CRT) or liquid crystal diode (LCD) screen is common, this embodiment can be implemented with other devices or possibly none. System management is able, with this embodiment of the present invention, to determine the actual location of the means of output of alert flags and the location is not limited to the physical device in which this embodiment of the present invention is resident.

Similarly connected via bus 650 are a possible alpha-numeric input device 606, cursor control 607, and communication I/O device 608. An alpha-numeric input device 606 may be implemented as any number of possible devices, including video CRT and LCD devices. The employment of cursor control 607 is predicated on the use of a graphic display device, 605. Communication input/output (I/O) device 608 can be implemented as a wide range of possible devices, including a serial connection, universal serial bus (USB), an infrared transceiver, a network adapter or a radio frequency (RF) transceiver.

The configuration of the devices in which this embodiment of the present invention is resident can vary without effect on the concepts presented here. The flexibility of the UDC concept provides a limitless variety of possible hardware device and inter-linking combinations in which embodiments of the present invention are able to provided.

This description of the embodiments of the present invention presents a system and method for archiving and restoring data residing in an operations center of a utility data center (UDC), utilizing the media agent, the backup storage and the cell manager that reside in the utility controller of the UDC and that are already configured for backing up and archiving data from the service core of the UDC.

Embodiments according to the present invention can be implemented as computer-usable medium having computer-readable code embodied therein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system for archiving and restoring data from an operations center of a utility data center, comprising:
   a plurality of subsystems, one or more of which comprise a database located in said operations center;
   a cell manager, located in a utility controller of said utility data center and coupled to each of said subsystems through a designated port in a firewall; and
   a media agent coupled to each of said subsystems through said designated port and to said cell manager, said media agent configured to receive data from said databases for forwarding to an archival storage device, wherein said data is archived on said archival storage device to enable restoration of said data.

2. The computer system described in claim 1, wherein said subsystems are configured with a pre-backup script, a post backup script and a disk agent, said disk agent for managing the sending of data to said media agent.

3. The computer system as described in claim 2, wherein said cell manager performs a method of archiving said data in said operations center, said method comprising:
   causing said designated port in said firewall to open at said scheduled time for said archiving of said data for one of said subsystems;
   causing said pre-backup script to run on said one of said subsystems;
   causing said post-backup script to run on said one of said subsystems following said sending of said data by said disk agent; and
   causing said designated port to close.

4. The computer system as described in claim 3, wherein said pre-backup script is for temporarily placing a particular database in backup mode, said particular database having a backup mode feature.

5. The computer system as described in claim 4 wherein said post-backup script is for changing said particular database running on said one of said subsystems from backup mode to normal mode.

6. The computer system as described in claim 3, wherein said backup script is for temporarily suspending applications on a particular database, said application running on said one of said subsystems, and wherein said particular database has no backup mode.

7. The computer system as described in claim 6, wherein said post-backup script is for restoring said applications running on said one of said subsystems.

8. The system as described in claim 1 wherein, in response to operator initiation, said cell manager performs a method of restoring said data in said operations center, said method comprising:
   causing said designated port to said firewall to open for said restoring of said data to one of said subsystems;
   causing cessation of programs running on said one of said subsystems;
   restoring said data from said archival storage device;
   causing said programs running on said one of said subsystems to restart following said restoring of said data; and
   causing said designated port to close.

9. A method of archiving data on a plurality of subsystems in an operations center of a utility data center, comprising:
   causing a designated port in a firewall to open at a pre-scheduled time for said archiving of said data for one of said subsystems;
   sending said data via said designated port by a disk agent on said one of said subsystems to a media agent for forwarding to a backup storage device, wherein archival of said data on said backup storage device is enabled; and
   causing said designated port to close.

10. The method as described in claim 9 wherein said subsystems are configured with a pre-backup script, a post-backup script, said pre-backup script and said post-backup script being unique to each database associated with one or more of said subsystems.

11. The method as described in claim 10, wherein said pre-backup script is for temporarily placing a particular database in backup mode, said particular database having a backup mode feature.

12. The method as described in claim 11 wherein said post-backup script is for changing said particular database running on said one of said subsystems from backup mode to normal mode.

13. The method as described in claim 10, wherein said backup script is for temporarily suspending applications on a particular database, said application running on said one of said subsystems, and wherein said particular database has no backup mode.

14. The method as described in claim 13, wherein said post-backup script is for restoring said applications running on said one of said subsystems.

15. The method as described in claim 10, further comprising:
   causing said pre-backup script to run on said one of said subsystems prior to said sending of said data; and
   causing said post-backup script to run on said one of said subsystems following said sending of said data.

16. The method as described in claim 15 wherein said causing is by a cell manager located in a utility controller of said utility data center.

17. The method as described in claim 16 wherein a media agent is located in said utility controller of said utility data center and coupled to said cell manager and to each of said subsystems through said designated port in said firewall.

18. The method as described in claim 16 wherein, in response to operator initiation, said cell manager performs a process of restoring data in said operations center, said process comprising:
   causing said designated port in said firewall to open for said restoring of said data to one of said subsystems;
   causing cessation of programs running on said one of said subsystems;
   restoring said data from said archival storage device;
   causing said programs running on said one of said subsystems to restart following said restoring of said data; and
   causing said designated port to close.

19. A computer-usable medium having computer-readable code embodied therein for causing a computer system to perform a method of archiving data on a plurality of subsystems in an operations center of a utility data center, comprising:
   opening a designated port in a firewall at a pre-scheduled time for archiving said data for one of said subsystem in said operations center of said utility data center;
   prompting a disk agent on said one of said subsystems to send said data via said designated port to a media agent for forwarding to a backup storage device, wherein archival of said data on said backup storage device is enabled; and
   closing said designated port.

20. The computer-usable medium as described in claim 19 wherein a database is associated with one or more of said subsystems are configured with a pre-backup script, a post-backup script, said pre-backup script and said post-backup script being unique to each of said databases.

21. The computer-usable medium as described in claim 20, wherein said pre-backup script is for temporarily placing a particular database in backup mode, said database having a backup mode feature.

22. The computer-usable medium as described in claim 21 wherein said post-backup script is for changing said particular database running on said one of said subsystems from backup mode to normal mode.

23. The computer-usable medium as described in claim 20, wherein said backup script is for temporarily suspending applications on a particular database, said application running on said one of said subsystems, and wherein said particular database has no backup mode.

24. The computer-usable medium as described in claim 23, wherein said post-backup script is for restoring said applications running on said one of said subsystems.

25. The computer-usable medium as described in claim 20, further comprising;
    initiating said pre-backup script on said one of said databases prior to said sending of said data; and
    initiating said post-backup script to run on said one of said databases following said sending of said data.

26. The computer-usable medium as described in claim 19 wherein said computer system is a cell manager, said cell manager located in a utility controller of said utility data center.

27. The computer-usable medium as described in claim 26 wherein a media agent is located in said utility controller of said utility data center and coupled to said cell manager and to each of said databases through said designated port in said firewall.

28. The computer-usable medium as described in claim 26 wherein, in response to operator initiation, said cell manager performs a method of restoring said data in said operations center, said method comprising:
    opening said designated port in said firewall for said restoring of said data to one of said databases;
    suspending the running of programs on said one of said databases;
    restoring said data from said archival storage device;
    restarting said programs running on said one of said databases following said restoring of said data; and
    closing said designated port.

* * * * *

UNITED STATES PATENT AND TRADEMARK OFFICE
CERTIFICATE OF CORRECTION

PATENT NO.         : 7,143,121 B2
APPLICATION NO. : 10/635594
DATED                 : November 28, 2006
INVENTOR(S)       : John Mendonca et al.

Page 1 of 1

It is certified that error appears in the above-identified patent and that said Letters Patent is hereby corrected as shown below:

In column 9, line 8, in Claim 1, after "database" insert -- , --.

In column 11, line 23, in Claim 25, delete "comprising;" and insert -- comprising: --, therefor.

Signed and Sealed this

Twenty-second Day of December, 2009

David J. Kappos
*Director of the United States Patent and Trademark Office*